Feb. 7, 1939.    J. ERICKSON    2,146,533
BEER TRUCK
Filed May 31, 1938    2 Sheets-Sheet 1
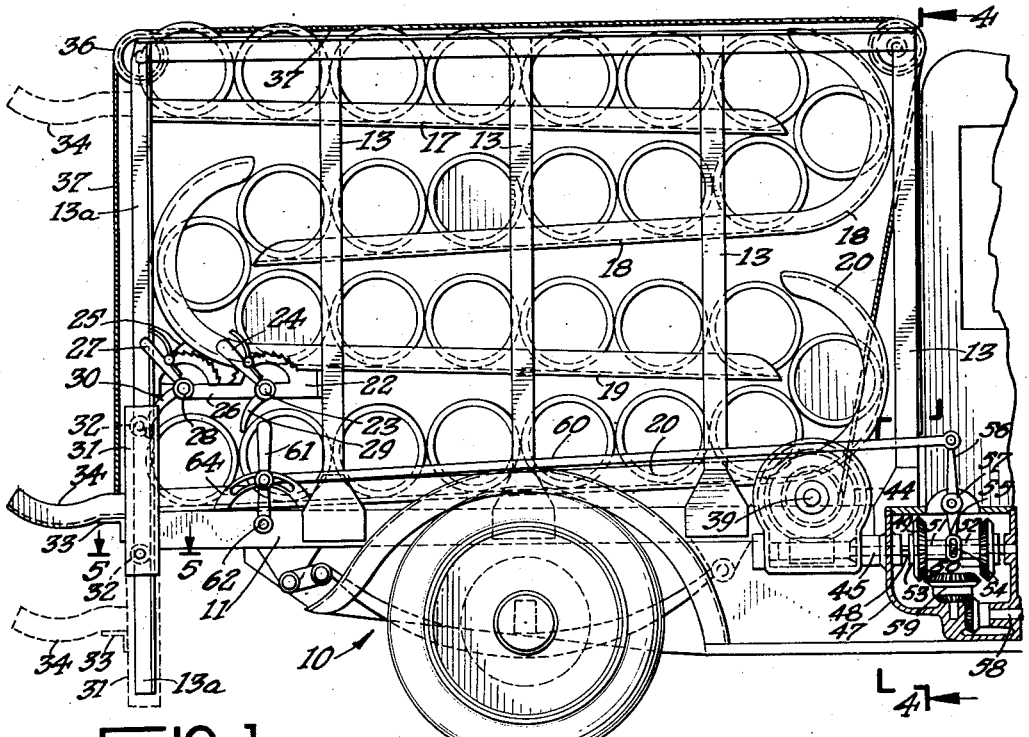
FIG.1.
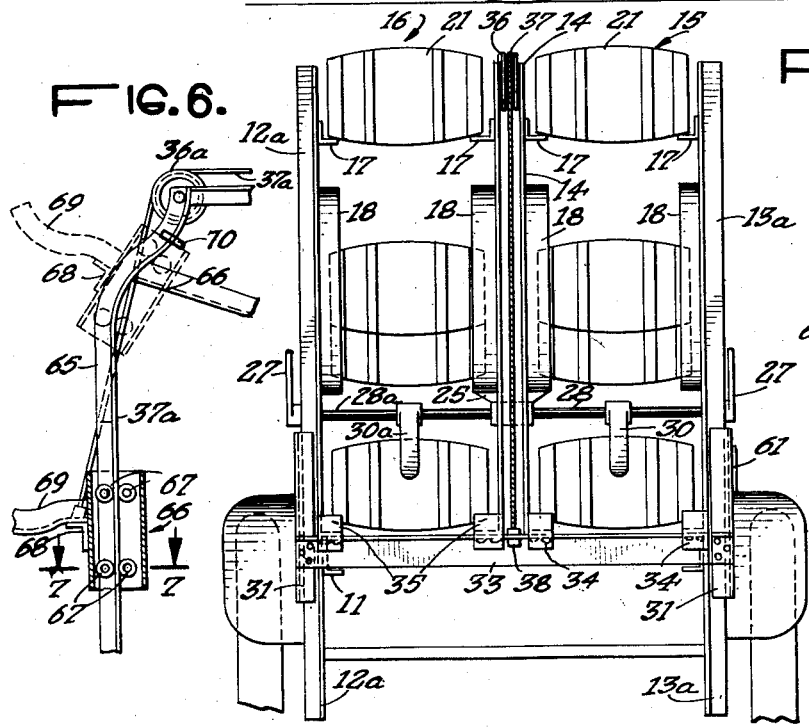
FIG.6.
FIG.2.
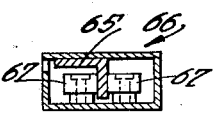
FIG.7.
INVENTOR.
JOHN ERICKSON.
J. Lederman
ATTORNEY.

Feb. 7, 1939. J. ERICKSON 2,146,533
BEER TRUCK
Filed May 31, 1938 2 Sheets-Sheet 2
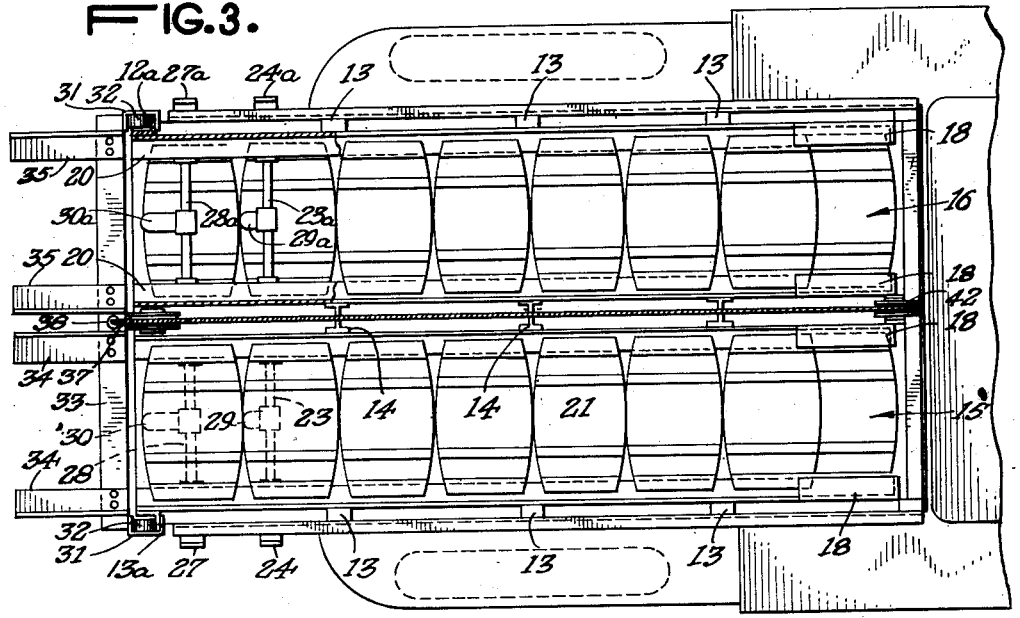
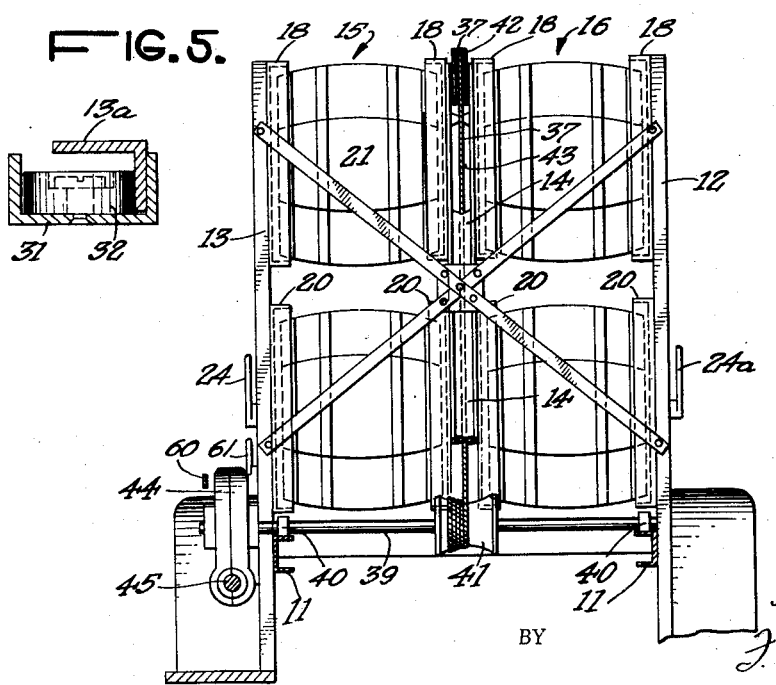
INVENTOR.
JOHN ERICKSON
BY
J. Ledermann
ATTORNEY.

Patented Feb. 7, 1939

2,146,533

UNITED STATES PATENT OFFICE 2,146,533

BEER TRUCK

John Erickson, Bayonne, N. J.

Application May 31, 1938, Serial No. 210,880

7 Claims. (Cl. 214—75)

This invention relates to beer trucks, such as are used by breweries for the transportation of beer barrels, and aims to provide a truck of novel construction which will facilitate the handling of the barrels in loading them on the truck as well as unloading them. By means of this invention the handler will save a considerable amount of time in these operations, and physical labor ordinarily required will be greatly reduced.

The above and other objects will become apparent in the description below in which like characters of reference refer to like-named parts in the accompanying drawings.

Referring briefly to the drawings, Figure 1 is a side elevational view of the truck, partly in section.

Figure 2 is a rear elevational view of the truck.

Figure 3 is a plan view of the truck, partly in section.

Figure 4 is a view looking rearward from the line 4—4 of Figure 1.

Figure 5 is an enlarged cross-sectional view through one of the carriage guides, taken on the line 5—5 of Figure 1.

Figure 6 is a fragmentary side elevational view partly in section, of the rear of the truck, showing a modified construction of the rear corner posts and slides.

Figure 7 is a cross-sectional view taken on the line 7—7 of Figure 6.

Referring in detail to the drawings, the numeral 10 represents a truck having the chassis frame or floor 11 and grill-like side walls formed of spaced-apart uprights or posts 12 on one side and 13 on the other side. The two rear corner posts 12a and 13a are formed of mutually-opposed angle irons. A third wall, similarly formed of uprights 14, serves as a central partition dividing the truck volume into two compartments, one alongside the other, shown at 15 and 16.

Each compartment 15 and 16 has a continuous runway, at a constant slope downward, formed by pairs of rails 17, 18, 19 and 20, the opposite rails of each pair having webs extending toward each other on which the barrels 21 are adapted to roll. The upper ends of the rails 18 are curved semi-circularly back around the lower ends of the rails 17, the upper ends of the rails 19 have similarly curved ends similarly turned back about the lower ends of the rails 18, and finally the upper ends of the rails 20 are likewise curved back around the lower ends of the rails 19. Thus, as is obvious, a continuous descending track or path is provided from the upper (rear) ends of the topmost rails 17 to the lower (rear) ends of the bottommost rails 20. Such a track is provided, as stated, in each of the compartments 15 and 16. It is obvious that if a barrel 21 were placed on the upper ends of the rails 17 it would roll down these rails, onto the rails 18 and down them, then onto the rails 19 and down them and finally onto the rails 20 and down to the ends of the latter at the rear of the truck.

Between the rails 19 and 20 on one side wall of the truck, in the compartment 15, a bracket 22 is fixed to the nearest upright 13, in which a shaft 23 is rotatably mounted on the outside end of which a bell crank 24 is rigidly secured. The other end of the shaft 23 is rotatable in a support 25 depending from the inner rails 18. The crank lever 24 is provided with a standard ratchet and pawl lock, as shown, so that the lever, and consequently the shaft 23, may be releasably locked in any position within the range of its swing. The bracket 22 has an outward extension 26 in which a second shaft 28 is rotatably mounted, and on the shaft 28 an identical bell crank 27 is fixed, the other end of the shaft 28 being also rotatable in the support 25. The shaft 23 has a rigid arched tongue 29 fixed intermediate its length, and the shaft 28 likewise has a similar tongue 30 similarly fixed thereon. Likewise, a similar pair of shafts 23a and 28a, with their corresponding bell cranks 24a and 27a, are similarly mounted in the same relative position in the compartment 16, the shafts 23a and 28a having similar arched tongues 29a and 30a, respectively. It is to be noted that when the crank 27 is tilted rearward, as shown in Figure 1, the lowermost barrel 21 in the track 20 of the compartment 15 is restrained by the tongue 30 from passing on rearwardly off the end of the track. When the crank 27 is swung to the right to raise the tongue 30 into the elevated position shown in broken lines, it is obvious that the said barrel is then free to roll off the end of the track. The other three cranks, 24, 24a, and 27a and their respective tongues 29, 29a, and 30a, are adapted to be swung through the same arcs.

The rear corner posts 12a and 13a are extended downward below the floor 11 to a point below the wheel hubs, and they serve as vertical guides on which channel-shaped slides 31 are slidably mounted with rollers 32. An angle-shaped cross arm 33 has the ends of its vertical web riveted to the slides 31. Riveted to the horizontal web of the cross arm 33 are four concave stub rails or fingers, those at the rear of the compartment 15 being indicated at 34, and those of the compartment 16, at 35. Each of the fingers 34 and 35 is positioned in alignment with one of the rails 20, these fingers being formed of the same angle-shaped irons as the previously mentioned rails, i. e., with mutually opposed webs so as to provide tracks on which the ends of the barrels may run.

In the top of the rearmost center uprights 14, a pulley 36 is mounted, over which a cable is trained whose end is anchored at 38 at the center of the cross arm 33. It is obvious that lifting of the cable 37 about the pulley 36 will raise the cross arm 33 and its fingers 34—35 between an extreme lower level indicated in broken lines at the bottom of Figure 1 and an extreme upper level also indicated in broken lines at the top of Figure 1. Both the slide 31 and the fingers 34 are shown in broken lines to indicate the lowermost position, but only the finger 34 is shown in the uppermost position, for the sake of simplicity. A lower limit stop, not shown, may be provided on the posts 12a and 13a to prevent the slides 31 from dropping off these posts.

A transverse shaft 39 is rotatably supported on the chassis 11 by straps 40, and rigid on the center thereof is a winding drum 41. A second pulley 42 is supported in the upper end of the foremost center upright 14, over which the cable 37 is trained on its way to the drum 41 about which it is adapted to be wound or unwound. In order that the rope may pass angularly downward and rearward from the pulley 42 to the drum 41, an opening 43 is provided in the web of the said foremost upright 14. By means of a worm and gear reducing box of standard design, shown at 44, the shaft 39 is geared to a stub shaft 45 at right angles thereto, the latter having a square end 46 extending into a transmission housing 47. A pair of oppositely disposed bevel pinions 49 and 50 are fixed on the opposite ends of a stub shaft 51 surrounded by a loose sleeve 52, the shaft 51 being in alignment with the shaft 45. A square socket 53 projects from the pinion 49 and the square end 48 registers therein. The shaft 51 has its other bearing in the housing 47. A pin 54 protrudes from the sleeve 52 and is loosely engaged in a fork 55 at the end of a lever 56 pivotally mounted on the housing at 57. A shaft 58, which is driven through any desired intermediate gears or transmission, not shown, by the drive shaft of the motor, has a pinion on its end in engagement with a pinion 59 which lies between the pinions 49 and 50 and is adapted to be engaged by either of the latter selectively. A rod 60 extends rearward to a lever 61 which is pivoted at 62 on the chassis 11. A pin 63 of the lever 61 rides in an arcuate slot of a guide 64. The ends of this slot providing limit stops for the extreme positions of the lever 61. It is apparent that, by swinging the lever 61 in one direction as far as it will go, while the motor is turning, the shaft 45, and hence the drum 41, will be rotated in one direction, and swinging the lever 61 to the opposite extreme position will cause rotation of those parts in the opposite direction. In the upright position of the lever, shown in Figure 1, the transmission in the housing 47 will be in neutral position, thus leaving the shaft 45 and the drum 41 at rest. Any desired braking means or lock, not shown, may be provided on the guides 31, the cable 37, or the drum 41, or in any other place, to prevent movement of these parts when the lever 61 is in neutral position.

Assuming that the truck is filled with full barrels of beer and that a delivery is to be made, the levers 24 and 27 are both in the positions shown in Figure 1, and the fingers 34—35 are in horizontal alignment with the rails 20. The lever 27 is then swung upward to raise its tongue 30 clear of the end barrel 21 of the compartment 15. This barrel will then either roll off its own weight onto the fingers 34, or a gentle shove will carry it there. Then the lever 27 is restored to its locking position. With the motor running, the lever 61 is then pushed to one side to cause the cable 37 to unwind from the drum 41, thus lowering the fingers 34 with the barrel to the lowermost position of the fingers 34, from which the barrel may be gently shoved off the fingers onto a mat on the ground. To remove a second barrel, the lever 24 is first swung upward, whence the next barrel will roll into the rearmost space previously occupied by the barrel which was just removed. Then the lever 24 is again restored to the position shown, and the operation just described to remove the end barrel is repeated, the fingers 34 having first been again raised to the position shown if full lines in the manner which is obvious.

To return an empty barrel to the top of the train of barrels in the compartment 15 (it is to be noted that for every barrel removed as just described, a space is provided at the rear or top end of the rails 17), the empty barrel is lifted onto the fingers 34 when the latter are in their lowermost position, then the fingers are raised to their uppermost position and the barrel is pushed onto the rear ends of the rails 17, whence it will roll against the last barrel in the train. When two barrels are to be removed at the same time, a barrel from each of the compartments 15 and 16 may be passed onto the fingers 34 and 35, respectively, before lowering the fingers. Likewise, two empty barrels may obviously also be restored to the truck simultaneously.

A modified form of construction of the rear posts and carriage slides is shown in Figure 6, the rear posts being bent inward toward the top, and the pulley 36a being set slightly forward (toward the front of the truck). The slide 66 comprises a housing enclosing the post 65 and having pairs of rollers 67 riding on opposite sides of one web of the post 65. The cross arm 68, secured to the two slides in the same manner as previously described in respect of the slides 31, also has similar upwardly curved fingers 69 similarly secured thereto. In the case of this modification, when the carriage in being elevated reaches the curved portion of the posts 65 it will tilt forward toward the truck, and when the fingers 69 reach the uppermost position shown in broken lines in Figure 6, the barrel or barrels carried thereon will be rolled by gravity from the fingers onto the upper section of track rails 17a. The limit stops 70 serve as a sudden check to the upward movement of the carriage so that the momentum of the rising barrel will cause the latter to keep moving to give it a start toward rolling off the fingers 69. This modified construction eliminates the necessity of the driver's reaching up to push the barrel onto the uppermost track rails.

When a truck is about to start on its rounds to make deliveries and collect empty barrels, by simply placing a mark on the topmost full barrel on leaving the brewery, the driver will know at all times which barrels are full and which empty, since the train of full barrels will extend from the outlet of each compartment up to and including the barrel thus marked, and all barrels above the marked barrel will be empty.

The many desirable features of the invention, particularly in respect of minimizing the amount of hard labor required in loading or unloading the barrels, are apparent without going into detail. It is also apparent that at no time will the driver be required to shift or rearrange the barrels by hand, nor to feel the weight of a barrel to test whether it is full or empty. Since the full barrels are always ready to be let out of the outlet, it will never be necessary to shift empty barrels to find one that is full. All of these advantages and others not mentioned serve to reduce not only the labor involved but also the time required in delivering and collecting barrels.

Obviously, modifications in form and structure may be made without departing from the spirit and scope of the invention.

I claim:

1. In a truck of the class described, a continuous downwardly sloping mounted track on the chassis of the truck having one end of said track at the top of the rear of the truck and the other end at the bottom of the rear thereof, said track being adapted to have barrels rotatably mounted thereon, means for releasably locking the lowermost of said barrels on said bottom end of the track, a carriage vertically slidably mounted on said truck adjacent said ends of said track, means for raising or lowering said carriage, said truck having a pair of rear corner posts, said carriage comprising members slidably mounted on said posts, a cross arm rigidly joining said members, scoop-like fingers extending outward from said cross arms, said fingers being each positioned in the same vertical plane with one of the rails of said track.

2. In a truck of the class described, a continuous downwardly sloping track mounted on the chassis of the truck having one end of said track at the top of the rear thereof, of the truck and the other end at the bottom of the rear, said track, being adapted to have barrels rotatably mounted thereon, means for releasably locking the lowermost of said barrels on said bottom end of the track, a carriage vertically slidably mounted on said truck adjacent said ends of said track, means for raising or lowering said carriage, said carriage having outwardly extending scoop-like fingers each positioned in the same vertical plane with one of the rails of said track, said rails of said track and said fingers being formed of oppositely disposed angle irons on the horizontal webs of which the barrels are adapted to be supported.

3. In a truck of the class described, a continuous downwardly sloping track mounted on the chassis of the truck having one end of said track at the top of the rear of the truck and the other end at the bottom of the rear thereof, said track being adapted to have barrels rotatably mounted thereon, means for releasably locking the lowermost of said barrels on said bottom end of the track, a carriage vertically slidably mounted on said truck adjacent said ends of said track, means for releasably locking the next to the said lowermost barrel on said bottom end of the track, each of said means comprising a lever rotatably mounted on the truck at a position above said bottom end of the track, a horizontal shaft fixed to said lever and rotatable therewith, said shaft having an arched tongue extending therefrom and adapted to be raised or lowered upon rotation of said shaft by said lever, said tongue in lowered position being adapted to engage a barrel lying thereunder and in raised position extending clear of said barrel.

4. In a truck of the character described, a continuous downwardly sloping track mounted on the chassis of the truck having one end of said track at the top of the rear of the truck and the other end of it on the bottom of the rear thereof, said track being adapted to have barrels rotatably mounted thereon, means for releasably locking the lowermost of said barrels on said bottom end of the track, a carriage slidably mounted on said truck adjacent said ends of said track, means for raising or lowering said carriage, said truck having a pair of rear corner posts, said posts being substantially vertical throughout the greater portions of their lengths to a point near the tops thereof, said posts above said point being arched toward the front of the truck, said carriage comprising members slidably mounted on said posts, a cross arm rigidly uniting said members, said carriage on passing said point during elevation thereof being tilted toward the front of the truck.

5. In a truck of the character described, a continuous downwardly sloping track mounted on the chassis of the truck having one end of said track at the top of the rear of the truck and the other end of it at the bottom of the rear hereof, said track being adapted to have barrels rotatably mounted thereon, means for releasably locking the lowermost of said barrels on said bottom end of the track, a carriage slidably mounted on said truck adjacent said ends of said track, means for raising or lowering said carriage, said truck having a pair of rear corner posts, said posts being substantially vertical throughout the greater portions of their lengths to a point near the tops thereof, said posts above said point being arched toward the front of the truck, said carriage comprising members slidably mounted on said posts, a cross arm rigidly uniting said members, said carriage on passing said point during elevation thereof being tilted toward the front of the truck, concave fingers projecting outward from said cross arm and adapted to carry a barrel thereon, said barrel being rolled off said fingers onto said upper end of said track when said members have reached the upper end of said arched portions of said posts.

6. In a truck of the character described, a continuous downwardly sloping track mounted on the chassis of the truck having one end of said track at the top of the rear of the truck and the other end of it at the bottom of the rear thereof, said track being adapted to have barrels rotatably mounted thereon, means for releasably locking the lowermost of said barrels on said bottom end of the track, a carriage slidably mounted on said truck adjacent said ends of said track, means for raising or lowering said carriage, said truck having a pair of rear corner posts, said posts being substantially vertical throughout the greater portions of their lengths to a point near the tops thereof, said posts above said point being arched toward the front of the truck, said carriage comprising members slidably mounted on said posts, a cross arm rigidly uniting said members, said carriage on passing said point during elevation thereof being tilted toward the front of the truck, concave fingers projecting outward from said cross arm and adapted to carry a barrel thereon, said barrel being rolled off said fingers onto said upper end of said truck when said members have reached the upper end of said arched portions of said posts, and a limit stop near the upper end of one of said posts adapted to be engaged by said carriage when the said members have reached said upper end of said arched portions of said post.

7. In a truck of the character described, a continuous downwardly sloping track mounted on the chassis of the truck having one end of said track at the top of the rear of the track and the other end of it on the bottom of the rear thereof, said track being adapted to have barrels rotatably mounted thereon, means for releasably locking the lowermost of said barrels on said bottom end of the track, a carriage slidably mounted on said truck adjacent said ends of said track, means for raising or lowering said carriage, said truck having a pair of rear corner posts, said posts being substantially vertical throughout the greater portions of their lengths to a point near the tops thereof, said posts above said point being arched toward the front of the truck, said carriage comprising members slidably mounted on said posts, a cross arm rigidly uniting said members, said carriage on passing said point during elevation thereof being tilted toward the front of the truck, said posts being formed of angle irons, said members each comprising a housing open at its upper and lower ends and enclosing the post, said housing having rollers on opposite sides of the inside thereof engaging opposite sides of one of the webs of the angle iron of the post.

JOHN ERICKSON.